UNITED STATES PATENT OFFICE.

CHARLES CARROLL GILMAN, OF ELDORA, IOWA.

POROUS EARTHENWARE GRAVEL FOR BEDDING TIES IN BRIDGE-WORK, &c.

SPECIFICATION forming part of Letters Patent No. 345,047, dated July 6, 1886.

Application filed April 2, 1886. Serial No. 197,542. (No specimens.)

*To all whom it may concern:*

Be it known that I, CHARLES CARROLL GILMAN, of Eldora, Hardin county, Iowa, have invented a new and useful Improvement in Porous Earthenware Gravel, or "Artificial Gravel," as it may be termed, of which the following is a specification.

The object of my invention is to provide a light and indestructible material in a form approximating gravel, which is a non-conductor of sound, and can be produced at a comparatively small expense.

In the manufacture of what is known as "terra-cotta lumber" or "porous terra-cotta," or "porous earthenware" material, there is more or less waste, resulting from broken and imperfect pieces, which is thrown into a "grog-pile," and has heretofore been considered as valueless. I take this material and prepare it for use in the following manner: I break it by machinery, or otherwise, into fragments varying from the size of a bullet upward to that of a hen's egg, screening the whole, so as to take out dust and small pieces. I prepare in a large box or reservoir a thin slip of hydraulic cement or its equivalent, making the same of about the consistency of good milk by adding water to the cement in sufficient quantity and stirring the mixture vigorously and thoroughly. Into this thin slip I dump the fragments of porous terra-cotta by the cart-load, stirring the same about rapidly until each piece or fragment is thoroughly coated with a film of cement. I then remove the pieces by raking them out with a fine-toothed rake. The coating on the pieces will quickly dry to a sufficient extent to prevent the adherence of the pieces to each other, though the cement will not thoroughly set and become strong for a week. It is then entirely waterproof, and may not improperly be termed "artificial gravel."

The porous terra-cotta or porous earthenware to which I have referred must be distinguished from ordinary terra-cotta. The former differs from the latter in being made extremely porous by the addition of sawdust, which is burned out in the kiln. Being so porous, it is very light, and is a poor conductor of heat and sound. The strong film of cement which covers the surface of the pieces prevents the filling up of the pores and the absorption of water.

This artificial gravel is useful for many purposes. It can be employed for bridge-work to bed the ties in, and it possesses qualities which especially fit it for this work—namely, lightness in weight and non-conductibility of sound. It can be used for "grouting" and for deafening purposes in the construction of houses. It also makes a light fire-proof and non-conducting filling between floors.

For inside work I vary the process slightly, first placing the uncoated fragments in position, and then dashing the slip of cement over the same, so as to coat and fasten them in their final position.

Having thus described my invention, what I claim, and desire to secure by Letters Patent, is—

The artificial gravel herein described, consisting of fragments or pieces of porous terra-cotta or porous earthenware coated with a film of cement, substantially as described.

In testimony whereof I have signed my name in the presence of two witnesses.

CHARLES CARROLL GILMAN.

Witnesses:
 THOMAS RIDER,
 AMBROSE RISDON.